May 18, 1943. J. W. DAWSON 2,319,215

CONDENSER WELDING SYSTEM

Filed Aug. 15, 1941

INVENTOR.
JOHN W. DAWSON,
BY Elmer J Gorn
ATTY.

Patented May 18, 1943

2,319,215

UNITED STATES PATENT OFFICE 2,319,215

CONDENSER WELDING SYSTEM

John W. Dawson, Auburndale, Mass., assignor to Raytheon Manufacturing Company, Newton, Mass., a corporation of Delaware Application August 15, 1941, Serial No. 407,034

9 Claims. (Cl. 219—4)

This invention relates to condenser welding systems, and more particularly to those systems in which electrical energy is stored in a condenser and then discharged through a welding transformer to deliver welding current to a resistance welding load.

In the copending application of Hans Klemperer, Serial No. 316,798, filed February 1, 1940, there is described a system in which the current supplied to the resistance welding load rises sharply and then persists at relatively high value for a sufficient length of time to cause the weld to be made. It is desirable in systems of this kind to provide means for regulating the wave shape of the current supplied to the load as well as the amount of energy delivered during each welding operation.

An object of this invention is to devise a condenser welding system of the foregoing type in which the wave shape of the current delivered to the load may be readily adjusted.

Another object is to devise an arrangement in which the amount of energy delivered from the condenser to the load may be adjusted without changing the charging conditions to which the condenser is subjected.

The foregoing and other objects of this invention will be best understood from the following description of an exemplification of my invention, reference being had to the accompanying drawing, wherein.

Figure 1:
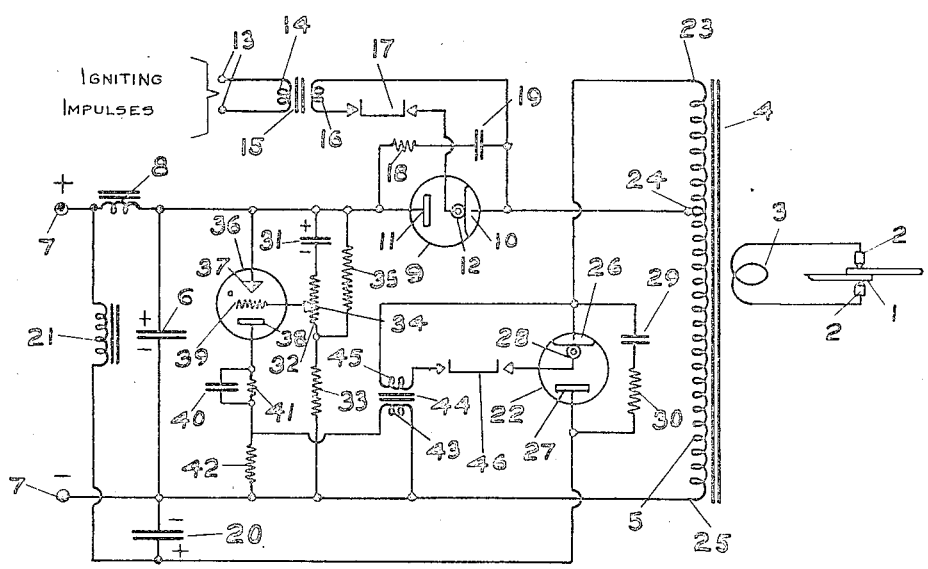
Fig. 1 is a diagram of a condenser welding system embodying my invention.

In the arrangement shown in Fig. 1, welding current is to be supplied to a resistance welding load 1 from a pair of welding electrodes 2 energized from the secondary winding 3 of a welding transformer 4 provided with a primary winding 5. The energy necessary to accomplish welding is adapted to be supplied to the primary winding 5 from condensers 6 and 20. These condensers are adapted to be charged from a pair of input terminals 7 energized from any suitable source of direct current, such as a generator, battery, rectifier or the like. In order to limit the charging current to the condensers 6 and 20 to a reasonable rate, impedances 8 and 21, which are preferably inductances, are connected in series with said condensers. Thus when the terminals 7 are energized, charging currents are supplied to the condensers 6 and 20 which thereupon are charged to a predetermined voltage.

The primary winding 5 of the welding transformer is provided with a tap 24 intermediate the ends thereof. The condenser 6 is adapted to be discharged through the portion of the primary winding 4 between the tap 24 and the lower end 25 thereof. For this purpose the negative side of the condenser 6 may be connected directly to the end 25, while the positive side of the condenser 6 is connected to the tap 24 through a controlled ignition discharge tube 9. The tube 9 is preferably of the pool cathode type with an igniter for initiating the cathode spot on the pool in order to cause the tube to conduct current. Although any suitable type of igniter may be used, it preferably consists of a conductor separated and insulated from the cathode by a thin glass layer. The tube 9 is provided with a pool cathode 10, preferably of mercury, connected to the tap 24, and also with an anode 11 connected directly to the positive side of the condenser 6. An igniter 12, preferably of the type as explained above, is provided for the cathode 10. In order to assist the tube 9 in reliable starting, a resistance 18 in series with the condenser 19 is preferably connected between the anode 11 and the cathode 10. In order to supply the igniter 12 with an igniting impulse for initiating discharge of the condenser 6, a secondary winding 16 of an igniting transformer 15 is connected between the igniter 12 and its associated cathode 10. Igniting impulses generated in the secondary winding 16 are distributed to the igniter 12 through a distributor 17, preferably of the type as described and claimed in the copending application of Percy L. Spencer, Serial No. 404,647, filed July 30, 1941. The primary winding 14 of the transformer 15 is supplied from the pair of terminals 13 with periodic igniting impulses. Thus when the distributor 17 closes the circuit to the igniter 12 and an igniting impulse is supplied thereto, the condenser 6 discharges through the primary winding 5 between the points 24 and 25.

Following the discharge of the condenser 6, the condenser 20 is also adapted to be discharged through the primary winding 5 of the welding transformer 4. However, this discharge is adapted to take place through the entire primary winding 5. For this purpose a controlled ignition discharge tube 22, preferably of the same type as tube 9, is connected between the condenser 20 and the upper end 23 of the primary winding 5. The tube 22 is provided with a pool cathode 26 connected to said point 23, and with an anode 27 connected to the positive side of the condenser 20. An igniter 28, preferably of the same type as that described in connection with igniter 12, is provided for the pool cathode 26. The tube 27 likewise has connected across it a condenser 29 in series with a resistance 30.

An igniting impulse is supplied to said igniter 28 at the proper time from the secondary winding 45 of an ignition transformer 44 having a primary winding 43. The igniting impulse is distributed to the igniter 28 through a distributor 46, likewise preferably of the type as described and claimed in said copending Spencer application.

In accordance with this invention, the firing point of the tube 22 may be delayed to any desired predetermined degree, whereby an accurate and flexible control of both the shape of the welding current and the amount of power supplied is secured. For this purpose a condenser 31 in series with resistances 32 and 33 is connected directly across the condenser 6 so that condenser 31 is charged to substantially the same voltage as initially appears across condenser 6. The resistance 32 is provided with an adjustable tap 34 so that any predetermined portion of the voltage appearing across the resistance 32 during operation may be taken off. The condenser 31 and resistance 32 are bypassed by an additional resistance 35.

The voltage derived from the tap 34 is used to control the firing of a rectifier 36, preferably of the gaseous discharge type, in which the firing is controlled by means of a control electrode. The tube 36 is provided with a cathode 37 connected to the positive side of the condenser 6, and with an anode 38 connected to the negative side of the condenser 6. A grid 39 for controlling the firing of the tube 36 is connected to the adjustable tap 34. A condenser 40 in parallel with a resistance 41 is connected in series with a resistance 42 in the circuit of the anode 38. Pulses of current which flow through the tube 36 produce corresponding impulses across the resistance 42. In order to utilize these impulses, the primary winding 43 of the igniting transformer 44 is connected across the resistance 42.

Figure 2:
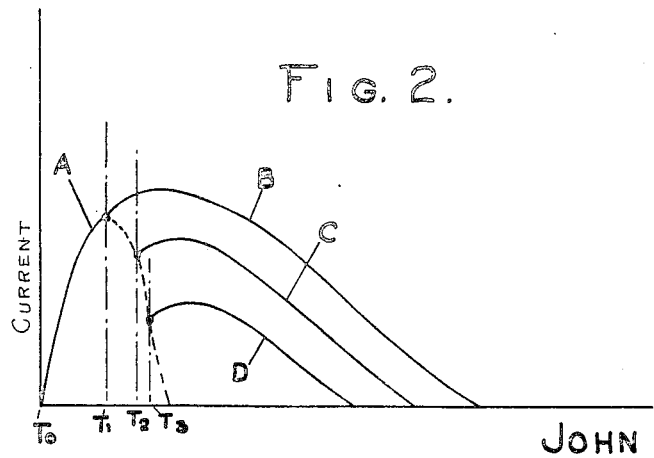
Fig. 2 is a set of curves illustrating the mode of operation of said invention.

The operation of the system described in Fig. 1 may be understood more clearly by referring to the curves shown in Fig. 2. The curves in Fig. 2 do not purport to show this operation quantitatively, although they do represent in a general qualitative manner the nature of said operation. At the time $T_0$ an igniting impulse is supplied to the igniter 12, firing the tube 9 and permitting the condenser 6 to discharge through the lower portion of the primary winding 5 of the welding transformer 4. During this discharge the current from the condenser rises rapidly along the curve A, and at the same time the voltage on the condenser decreases from its predetermined maximum value to zero. Thus at the time $T_1$ the voltage across the condenser 6 has fallen to zero, and is tending to reverse while a substantial predetermined amount of current is flowing in the primary winding 5 and thus in the resistance welding load 1. Upon the voltage across the condenser 6 tending to reverse, the polarity on the tube 36 likewise reverses tending to fire said tube. However, unless the grid 39 has the proper potential with respect to the cathode 37, the tube 36 cannot fire. Ordinarily such a potential is one in which the grid 39 is slightly positive with respect to the cathode 37. During the discharge of the condenser 6, the condenser 31 likewise would tend to discharge. However, the resistance network 32, 33 and 35 gives to the condenser 31 a predetermined time constant which preferably is less than the time constant of the discharge circuit for the condenser 6. During said discharge, therefore, the voltage at the point 34 will decrease from its normal negative value to zero, and then tend to reverse. By adjusting the tap 34 the point at which the grid 39 reaches its firing value can be readily adjusted. If this time is adjusted so that it occurs substantially at $T_1$, at that point the tube 36 will start to conduct current. This current will flow through the condenser 40 and limit the discharge through said tube 36 to a relatively short pulse, the resistance 41 being a leakage resistance and passing insufficient current to participate to any substantial degree in this current impulse. The pulses of current thus produced flows through the resistance 42 and supplies an igniting impulse through the transformer 44 to the igniter 28, whereupon the tube 22 is fired.

When the tube 22 is fired, the condenser 20 discharges throughout the entire primary winding 5, causing the current to proceed from the time $T_1$ along the curve B, as more fully described in said copending Klemperer application. As pointed out therein the discharge current of condenser 6 which follows the curve A tends to be oscillatory while the discharge of the condenser 20 through the additional turns of the primary welding 5 makes its discharge current, which, for example, follows the curve B, non-oscillatory.

By adjusting the tap 34, the grid 39 can be made to fire the tube 36 at later points, for example $T_2$ or $T_3$. Under these conditions the discharge current from the condenser 6 starts to decrease along the normal oscillatory curve A, and a larger voltage in the inverse direction is built up across the condenser 6. This represents a return of some of the energy originally stored in the condenser 6 without being dissipated in the welding load 1. When the tube 36 is fired at the points $T_2$ or $T_3$, the current then proceeds to decrease along the curves C and D, respectively.

It will be noted that in the above arrangement the amount of energy delivered to the welding load under the three conditions of operation illustrated is successively less without any change in the adjustment of the charging of the condenser 6. Furthermore the wave shape of the current supplied to the welding load is likewise varied. Thus it will be seen that merely by adjusting the single resistance tap 34, a large degree of flexibility of energy supplied to the resistance welding load as well as the wave shape of the current supplied thereto is obtained.

Of course it is to be understood that this invention is not limited to the particular details as described above as many equivalents will suggest themselves to those skilled in the art. For example, instead of having a condenser 20 supply the pulse of current after the condenser 6 has been discharged, other sources of such additional current impulses could be used, such as a direct current or alternating current source. In each case the delay in supplying such additional pulse of current will produce the control of the energy and wave shape as described herein. It is accordingly desired that the appended claims be given a broad interpretation commensurate with the scope of the invention within the art.

What is claimed is:

1. A welding system comprising an electrical energy storage device, means for supplying energy to said storage device, a welding load circuit, an additional source of electrical current, means for discharging the energy stored in said storage device into said load circuit, and means operating after a predetermined period of delay after substantially complete discharge of said storage device for connecting said additional source of current to said load circuit in such closely timed sequence as to produce a unitary welding action.

2. A welding system comprising an electrical energy storage device, an additional electrical energy storage device, means for supplying energy to said storage devices, a welding load circuit, means for discharging the energy stored in the first of said storage devices into said load circuit, and means operating after a predetermined period of delay after substantially complete discharge of said first storage device for discharging said additional storage device into said load circuit in such closely timed sequence as to produce a unitary welding action.

3. A welding system comprising a plurality of condensers, means for discharging one of said condensers into said load circuit, and means operating after a predetermined period of delay after substantially complete discharge of said last-named condenser to discharge another of said condensers into said load circuit in such closely timed sequence as to produce a unitary welding action.

4. A welding system comprising a plurality of condensers, means for discharging one of said condensers into said load circuit, the constants of said condenser as related to its discharge circuit so established being such as to tend to make said discharge oscillatory, and means operating after a predetermined period of delay after substantially complete discharge of said last-named condenser to discharge another of said condensers into said load circuit in such closely timed sequence as to produce a unitary welding action.

5. A welding system comprising a plurality of condensers, means for discharging one of said condensers into said load circuit, the constants of said condenser as related to its discharge circuit so established being such as to tend to make said discharge oscillatory, and means operating after a predetermined period of delay after substantially complete discharge of said last-named condenser to discharge another of said condensers into said load circuit, the constants of said last-named condenser as related to its discharge circuit so established being such as to make the discharge of said last-named condenser non-oscillatory.

6. A welding system comprising a plurality of condensers, means for discharging one of said condensers into said load circuit, the constants of said condenser as related to its discharge circuit so established being such as to tend to make said discharge oscillatory, and time delay means responsive to reversal of voltage on said last-named condenser to discharge another of said condensers into said load circuit after a predetermined period of delay following said reversal of voltage.

7. A welding system comprising a plurality of condensers, means for discharging one of said condensers into said load circuit, the constants of said condenser as related to its discharge circuit so established being such as to tend to make said discharge oscillatory, and time delay means responsive to reversal of voltage on said last-named condenser to discharge another of said condensers into said load circuit after a predetermined period of delay following said reversal of voltage, the constants of said last-named condenser as related to its discharge circuit so established being such as to make the discharge of said last-named condenser non-oscillatory.

8. A welding system comprising a plurality of condensers, means for discharging one of said condensers into said load circuit, the constants of said condenser as related to its discharge circuit so established being such as to tend to make said discharge oscillatory, and time delay means responsive to reversal of voltage on said last-named condenser to discharge another of said condensers into said load circuit after a predetermined period of delay following said reversal of voltage, said time delay means being adjustable to adjust said period of delay.

9. A welding system comprising a plurality of condensers, means for discharging one of said condensers into said load circuit, the constants of said condenser as related to its discharge circuit so established being such as to tend to make said discharge oscillatory, and time delay means responsive to reversal of voltage on said last-named condenser to discharge another of said condensers into said load circuit after a predetermined period of delay following said reversal of voltage, said time delay means including a condenser-resistance circuit with a predetermined time constant.

JOHN W. DAWSON.